United States Patent
Xiong

(10) Patent No.: US 9,626,597 B2
(45) Date of Patent: Apr. 18, 2017

(54) SYSTEMS AND METHODS FOR FACIAL AGE IDENTIFICATION

(71) Applicant: Tencent Technology (Shenzhen) Company Limited, Shenzhen (CN)

(72) Inventor: Pengfei Xiong, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 57 days.

(21) Appl. No.: 14/265,846

(22) Filed: Apr. 30, 2014

(65) Prior Publication Data

US 2014/0334734 A1 Nov. 13, 2014

Related U.S. Application Data

(63) Continuation of application No. PCT/CN2013/088173, filed on Nov. 29, 2013.

(30) Foreign Application Priority Data

May 9, 2013 (CN) .......................... 2013 1 0169175

(51) Int. Cl.
  *G06K 9/00* (2006.01)
  *G06K 9/62* (2006.01)

(52) U.S. Cl.
  CPC ....... *G06K 9/6255* (2013.01); *G06K 9/00288* (2013.01); *G06K 2009/00322* (2013.01)

(58) Field of Classification Search
  CPC ..... G06K 2009/00322; G06K 9/00288; G06K 9/6255
  See application file for complete search history.

(56) References Cited

U.S. PATENT DOCUMENTS 7,319,779 B1   1/2008 Mummareddy et al.
7,505,621 B1   3/2009 Agrawal et al.
(Continued)

FOREIGN PATENT DOCUMENTS

CN   1635543 A   7/2005
CN   1967561 A   5/2007
(Continued)

OTHER PUBLICATIONS

Yun Fu, Guodong Guo, and Thomas S. Huang, "Age Synthesis and Estimation via Faces: A Survey", Nov. 2010, IEEE Transactions on Pattern Analysis and Machine Intelligence, vol. 32, No. 11, pp. 1955-1976.*

(Continued)

*Primary Examiner* — Siamak Harandi
(74) *Attorney, Agent, or Firm* — Jones Day

(57) ABSTRACT

Systems and methods are provided for acquiring classification functions for facial age identification. For example, a plurality of facial images associated with different ages are acquired; the facial images are assigned into a plurality of facial image collections based on at least information associated with a plurality of first age groups; for a first age group, one or more first facial image collections associated with one or more second age groups older than the first age group are acquired as positive samples; one or more second facial image collections associated with one or more third age groups younger than the first age group are acquired as negative samples; and training is performed based on at least information associated with the first positive samples and the negative samples to determine one or more classification functions for the first age groups.

16 Claims, 6 Drawing Sheets

(56) References Cited

U.S. PATENT DOCUMENTS

| | | | |
|---|---|---|---|
| 7,912,246 B1* | 3/2011 | Moon | G06K 9/00221 382/103 |
| 8,027,521 B1 | 9/2011 | Moon et al. | |
| 8,520,906 B1 | 8/2013 | Moon et al. | |
| 8,705,875 B1 | 4/2014 | Ricanek, Jr. | |
| 2004/0066966 A1 | 4/2004 | Schneiderman | |
| 2004/0228528 A1 | 11/2004 | Lao | |
| 2012/0140069 A1 | 6/2012 | Ding et al. | |
| 2012/0308087 A1* | 12/2012 | Chao | G06K 9/00221 382/115 |
| 2012/0320181 A1 | 12/2012 | Hong et al. | |
| 2013/0121584 A1 | 5/2013 | Bourdev et al. | |
| 2013/0254143 A1 | 9/2013 | Ueki et al. | |
| 2014/0016871 A1 | 1/2014 | Son et al. | |
| 2014/0156398 A1 | 6/2014 | Li et al. | |
| 2014/0201126 A1 | 7/2014 | Zadeh et al. | |
| 2014/0215504 A1 | 7/2014 | Hsiao et al. | |
| 2014/0334734 A1 | 11/2014 | Xiong | |
| 2014/0341422 A1 | 11/2014 | Xiong et al. | |

FOREIGN PATENT DOCUMENTS

| | | |
|---|---|---|
| CN | 101584575 A | 11/2009 |
| CN | 101706874 A | 5/2010 |
| CN | 101996308 A | 3/2011 |
| CN | 102708497 A | 10/2012 |
| CN | 102902986 A | 1/2013 |
| WO | WO 2012/104830 A1 | 8/2012 |

OTHER PUBLICATIONS

Patent Cooperation Treaty, International Search Report, PCT/CN2013/088173, mailed Feb. 20, 2014.

China Patent Office, Office Action issued Apr. 5, 2016, in Application No. 201310169175.0.

Patent Cooperation Treaty, Written Opinion of the International Searching Authority, PCT/CN2013/088173; mailed Feb. 20, 2014.

Patent Cooperation Treaty, International Preliminary Report on Patentability, PCT/CN2013/088173; issued Nov. 10, 2015.

Wang, Xianmei et al.; Age Estimation by Facial Image: A Survey; Journal of Image and Graphics, 17(6); pp. 603-618; Jun. 2012.

United States Patent and Trademark Office, Notice of Allowance mailed Mar. 24, 2016, in U.S. Appl. No. 14/149,970.

China Patent Office, Office Action issued Oct. 8, 2015, in Application No. 201310172492.8.

Patent Cooperation Treaty, International Search Report, PCT/CN2013/085374, Feb. 20, 2014.

United States Patent and Trademark Office, Office Action mailed Jul. 1, 2015, in U.S. Appl. No. 14/149,970.

United States Patent and Trademark Office, Office Action mailed Dec. 16, 2015, in U.S. Appl. No. 14/149,970.

Guo, Guodong, et al., Human Age Estimation Using Bio-inspired Features, IEEE 2009; pp. 112-119.

Serre, Thomas, et al., Object Recognition with Features Inspired by Visual Cortex, Computer Vision and Pattern Recognition, 2005; IEEE Jun. 20-25, 2005.

Song, Dongjin, Tao, Dacheng, Biologically Inspired Feature Manifold for Scene Classification, IEEE Transactions on Image Processing, 19(1), pp. 174-184, Jan. 2010.

China Patent Office, Office Action issued Sep. 2, 2016, in Application No. 201310169175.0.

Patent Cooperation Treaty, International Preliminary Report on Patentability, PCT/CN2013/085374, Nov. 10, 2015.

Patent Cooperation Treaty, Written Opinion of the International Searching Authority, PCT/CN2013/085374, Feb. 20, 2014.

United States Patent and Trademark Office, Notice of Allowance mailed Feb. 22, 2017, in U.S. Appl. No. 14/149,970.

* cited by examiner

SYSTEMS AND METHODS FOR FACIAL AGE IDENTIFICATION

CROSS-REFERENCES TO RELATED APPLICATIONS

This application is a continuation of International Application No. PCT/CN2013/088173, with an international filing date of Nov. 29, 2013, which claims priority to Chinese Patent Application No. 201310169175.0, filed May 9, 2013, both applications being incorporated by reference herein for all purposes.

FIELD OF THE INVENTION

Certain embodiments of the present invention are directed to computer technology. More particularly, some embodiments of the invention provide systems and methods for data processing. Merely by way of example, some embodiments of the invention have been applied to image processing. But it would be recognized that the invention has a much broader range of applicability.

BACKGROUND OF THE INVENTION

With the development of facial identification technology, user demands for identification of facial attributes continue to increase, such as facial age identification, facial gender identification and identification of a facial-happiness degree. For example, facial age identification helps to collect information of users of different age groups for analysis of popularity of certain products among different age groups.

Before identifying a facial age, multiple image samples are often acquired and the image samples are classified into several age groups. For a particular age group, the image samples that fall into the age group are usually taken as positive samples and the image samples that belong to other age groups are taken as negative samples. Training can be performed according to the positive samples and the negative samples to generate a classification function corresponding to each age group. Such a classification function can be used to estimate an age group for certain later-acquired facial images.

The above-noted conventional approach has certain problems. For example, the number of negative samples for a certain age group is over ten times the number of positive samples for the age group. Due to the uneven numbers of the positive samples and the negative samples for the age group, the positive samples and the negative samples often cannot be accurately selected during training and hence the classification function acquired from the training is usually inaccurate. Such an inaccurate classification function may not be used to accurately identify facial age, and therefore often causes a high error rate.

Hence it is highly desirable to improve the techniques for facial age identification.

BRIEF SUMMARY OF THE INVENTION

According to one embodiment, a method is provided for acquiring classification functions for facial age identification. For example, a plurality of facial images associated with different ages are acquired; the facial images are assigned into a plurality of facial image collections based on at least information associated with a plurality of first age groups, wherein a first age group corresponds to a facial image collection and a facial image collection includes one or more facial images; for a first age group, one or more first facial image collections associated with one or more second age groups older than the first age group are acquired as positive samples; one or more second facial image collections associated with one or more third age groups younger than the first age group are acquired as negative samples; and training is performed based on at least information associated with the first positive samples and the negative samples to determine one or more classification functions for the first age groups.

According to another embodiment, a method is provided for facial age identification. For example, a facial image is acquired for facial age identification; textural features of the facial image are extracted; the facial image are classified based on at least information associated with the textural features and one or more classification functions for one or more age groups; a plurality of classification results are acquired, a classification result corresponding to an age group; and an estimated age group for the facial image is determined based on at least information associated with the plurality of classification results.

According to yet another embodiment, a device for acquiring classification functions for facial age identification includes a facial-image-acquisition module configured to acquire a plurality of facial images, an image-collection-division module configured to assign the facial images into a plurality of facial image collections based on at least information associated with a plurality of first age groups to be identified, wherein a first age group corresponds to a facial image collection and a facial image collection includes one or more facial images, a positive-and-negative-sample-acquisition module configured to, for a first age group, acquire one or more first facial image collections associated with one or more second age groups older than the first age group as positive samples and acquire one or more second facial image collections associated with one or more third age groups younger than the first age group as negative samples, and a classification-function-determination module configured to perform training based on at least information associated with the first positive samples and the negative samples to determine one or more classification functions for the first age groups.

In one embodiment, a device for facial age identification includes a facial-image-acquisition module configured to acquire a facial image for facial age identification, a textual-feature-extraction module configured to extract textural features of the facial image, a classification-result-acquisition module configured to classify the facial image based on at least information associated with the textural features and one or more classification functions for one or more age groups and acquire a plurality of classification results, a classification result corresponding to an age group, and an age-determination module configured to determine an estimated age group for the facial image based on at least information associated with the plurality of classification results.

In another embodiment, a system for acquiring classification functions for facial age identification includes one or more data processors, and a computer-readable storage medium encoded with instructions for commanding the data processors to execute certain operations. For example, a plurality of facial images associated with different ages are acquired; the facial images are assigned into a plurality of facial image collections based on at least information associated with a plurality of first age groups, wherein a first age group corresponds to a facial image collection and a facial image collection includes one or more facial images; for a first age group, one or more first facial image collections associated with one or more second age groups older than the first age group are acquired as positive samples; one or more second facial image collections associated with one or more third age groups younger than the first age group are acquired as negative samples; and training is performed based on at least information associated with the first positive samples and the negative samples to determine one or more classification functions for the first age groups.

In yet another embodiment, a system for facial age identification includes one or more data processors and a computer-readable storage medium encoded with instructions for commanding the data processors to execute operations. For example, a facial image is acquired for facial age identification; textural features of the facial image are extracted; the facial image are classified based on at least information associated with the textural features and one or more classification functions for one or more age groups; a plurality of classification results are acquired, a classification result corresponding to an age group; and an estimated age group for the facial image is determined based on at least information associated with the plurality of classification results.

According to one embodiment, a non-transitory computer readable storage medium comprises programming instructions for acquiring classification functions for facial age identification. The programming instructions are configured to cause one or more data processors to execute operations. For example, a plurality of facial images associated with different ages are acquired; the facial images are assigned into a plurality of facial image collections based on at least information associated with a plurality of first age groups, wherein a first age group corresponds to a facial image collection and a facial image collection includes one or more facial images; for a first age group, one or more first facial image collections associated with one or more second age groups older than the first age group are acquired as positive samples; one or more second facial image collections associated with one or more third age groups younger than the first age group are acquired as negative samples; and training is performed based on at least information associated with the first positive samples and the negative samples to determine one or more classification functions for the first age groups.

According to another embodiment, a non-transitory computer readable storage medium comprises programming instructions for facial age identification. The programming instructions are configured to cause one or more data processors to execute operations. For example, a facial image is acquired for facial age identification; textural features of the facial image are extracted; the facial image are classified based on at least information associated with the textural features and one or more classification functions for one or more age groups; a plurality of classification results are acquired, a classification result corresponding to an age group; and an estimated age group for the facial image is determined based on at least information associated with the plurality of classification results.

For example, the systems and methods described herein are configured to select facial images with ages older than a current age group as positive samples, select facial images with ages younger than the current age group as negative samples and perform training according to the positive samples and the negative samples of each age group to determine a classification function for each age group in order to estimate a facial age according to the classification function during facial age identification on a facial image, so that the accuracy of facial age identification and the performance of a classifier for facial age estimation are improved due to approximately even numbers of the positive samples and the negative samples. In another example, the systems and methods described herein are configured to use a classification function for each age group to determine if a facial age of a facial image is the same as, older than or younger than a current age group and comprehensively analyze the classification results of each age group to determine an estimated age of the facial image, so as to improve the accuracy of facial age identification and the performance of a classifier for facial age estimation.

Depending upon embodiment, one or more benefits are achieved. These benefits and various additional objects, features and advantages of various embodiments of the present invention are fully appreciated with reference to the detailed description and accompanying drawings that follow.

DETAILED DESCRIPTION OF THE INVENTION

Figure 1:
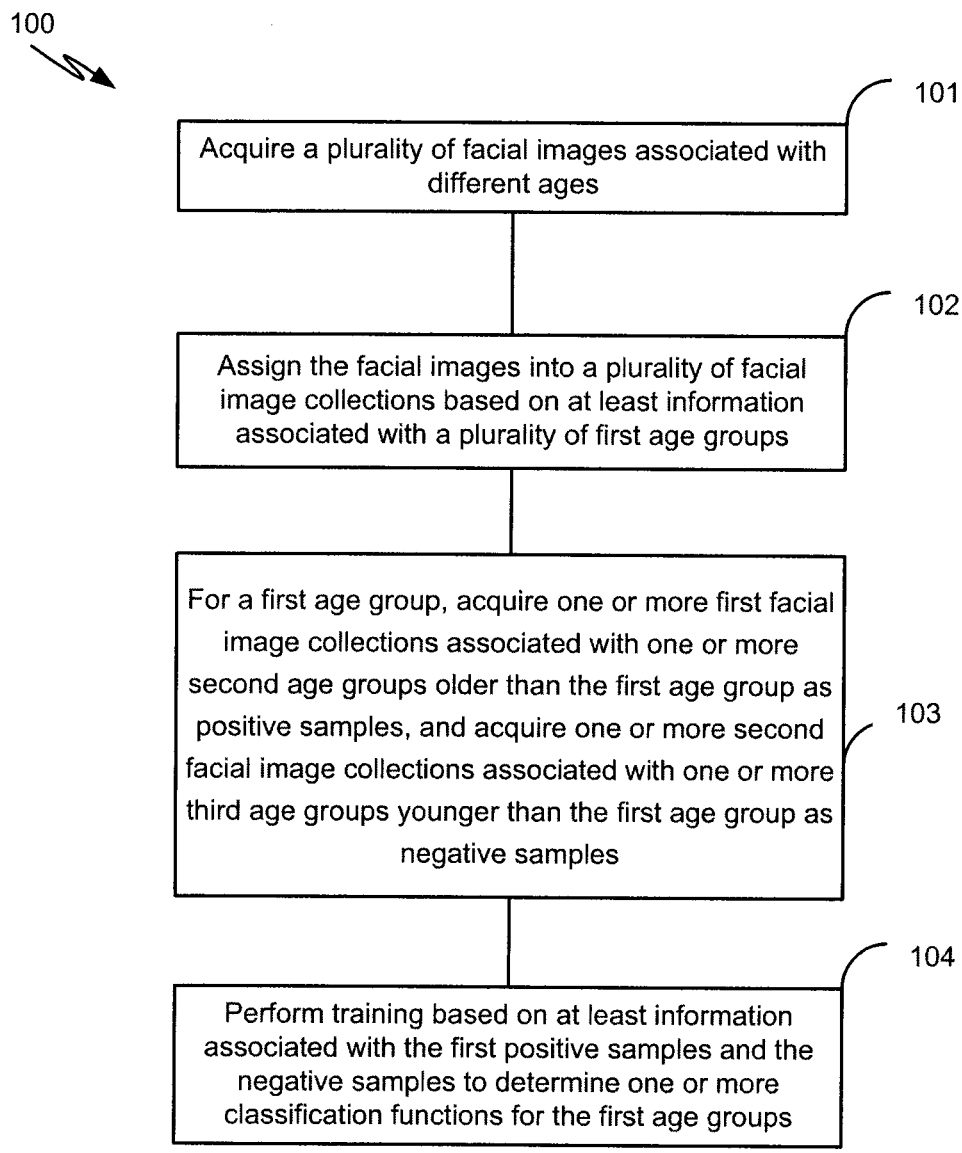
FIG. 1 is a simplified diagram showing a method for acquiring classification functions for facial age identification according to one embodiment of the present invention.

FIG. 1 is a simplified diagram showing a method for acquiring classification functions for facial age identification according to one embodiment of the present invention. This diagram is merely an example, which should not unduly limit the scope of the claims. One of ordinary skill in the art would recognize many variations, alternatives, and modifications. The method 100 includes at least the process 101 for acquiring a plurality of facial images associated with different ages, the process 102 for assigning the facial images into a plurality of facial image collections based on at least information associated with a plurality of first age groups, where a first age group corresponds to a facial image collection and a facial image collection includes one or more facial images, the process 103 for a first age group, acquiring one or more first facial image collections associated with one or more second age groups older than the first age group as positive samples and acquiring one or more second facial image collections associated with one or more third age groups younger than the first age group as negative samples, and the process 104 for performing training based on at least information associated with the first positive samples and the negative samples to determine one or more classification functions for the first age groups.

According to one embodiment, during the process 101, a plurality of facial images associated with different ages are acquired. For example, the plurality of facial images include facial images of certain people of different ages and may include photos and/or frames in a video stream. As an example, during the process 102, the facial images are assigned into a plurality of facial image collections based on at least information associated with a plurality of first age groups, where a first age group corresponds to a facial image collection and a facial image collection includes one or more facial images. In another example, according to a predetermined age span, a plurality of age groups are established. For example, the predetermined age span is 5 years, and the age groups of 1 year old to 5 years old, 6 years old to 10 years old, 11 years old to 15 years old, etc. are established. According to the established age groups, the facial images of a same age group are assigned to a same facial image collection, so as to obtain multiple facial image collection, where each age group corresponds to a facial image collection.

According another embodiment, during the process 103, for a first age group, one or more first facial image collections associated with one or more second age groups older than the first age group are acquired as positive samples, and one or more second facial image collections associated with one or more third age groups younger than the first age group are acquired as negative samples. For example, the positive samples can be selected according to Equation (1):

$$\text{sample}_{pos} = \{\text{sample} | \text{age}_s > \text{age}_t + k\} \quad (1)$$

where $\text{sample}_{pos}$ represents a selected positive sample, $\text{age}_s$ represents an age of a facial image of which sample attributes are to be determined, $\text{age}_t$ represents an age group of which a classification function is to be determined, and k is an adjustment threshold. In another example, the negative samples can be selected according to Equation (2):

$$\text{sample}_{neg} = \{\text{sample} | \text{age}_s > \text{age}_t + k\} \quad (2)$$

where $\text{sample}_{neg}$ represents a selected negative sample. During the process of selecting samples, k is used as the adjustment threshold to select samples with a greater age difference for training in order to obtain the positive samples and the negative samples which have greater differences, in some embodiments.

According to yet another embodiment, during the process 104, training is performed based on at least information associated with the first positive samples and the negative samples to determine one or more classification functions for the first age groups. For example, support-vector machine (SVM) classifiers are trained according to the positive samples and the negative samples of each age group. m groups of classifiers are obtained, where m represents a number of established age groups. As an example, a classification function is used for determining if the age of the facial image to be classified is older than the age group corresponding to the classification function. If the age group of the facial image to be classified is older than the age group corresponding to the classification function, the classification result is 1; and if the age group of the facial image to be classified is younger than the age group corresponding to the classification function, the classification result is 0, in some embodiments. For example, according to the positive samples and the negative samples of each age group, the textural features of the positive samples and the negative samples are extracted and training is performed according to the textural features to determine the classification function for each age group. As an example, the classification function is a SVM, a decision-making tree, a random forest, a adaboost algorithm, other binary classification methods or other multi-classification methods. In another example, classification results are obtained using the classification function for facial age identification of the facial image. An estimated age group for the facial image is determined based on at least information associated with the plurality of classification results, in certain embodiments.

In one embodiment, before performing training based on at least information associated with the first positive samples and the negative samples to determine one or more classification functions for the first age groups, the method 100 further includes a process for determining weights of the positive samples and the negative samples of a first age group with respect to a current age group based on at least information associated with age differences between the current age group and the positive samples and the negative samples of the first age group, where the performing training based on at least information associated with the first facial image collections and the second facial image collections to determine one or more classification functions for the first age groups includes, and a process for performing training based on at least information associated with the positive samples and the negative samples of a first age group and the weights of the positive samples and the negative samples of the first age group to determine the one or more classification functions. For example, the process for acquiring a plurality of facial images associated with different ages includes a process for acquiring a plurality of original images including at least human faces, and a process for acquiring the plurality of facial images based on at least information associated with the original images. In another example, the process for acquiring the plurality of facial images based on at least information associated with the original images includes, a process for performing facial detection and eye positioning to acquire a facial position and an eye position for an original image, and a process for calibrating the original image based on at least information associated with the facial position and the eye position to acquire the plurality of facial images.

In another embodiment, the process 104 for performing training based on at least information associated with the first positive samples and the negative samples to determine one or more classification functions for the first age groups includes a process for extracting textural features of the positive samples and the negative samples of a first age group, and a process for performing training based on at least information associated with the textual features of the positive samples and the negative samples of the first age group and the weights of the positive samples and the negative samples of the first age group to determine the classification functions. For example, the process for extracting textural features of the positive samples and the negative samples of a first age group includes a process for extracting initial textural features of positive samples and the negative samples of a first age group, and a process for performing Principal component analysis (PCA) dimensionality reduction on the initial textural features to acquire the textural features of the positive samples and the negative samples of the first age group. In some embodiments, after the process 104, the method 100 further includes a process for determining an estimated age of a facial image based on at least information associated with the classification functions.

Figure 2:
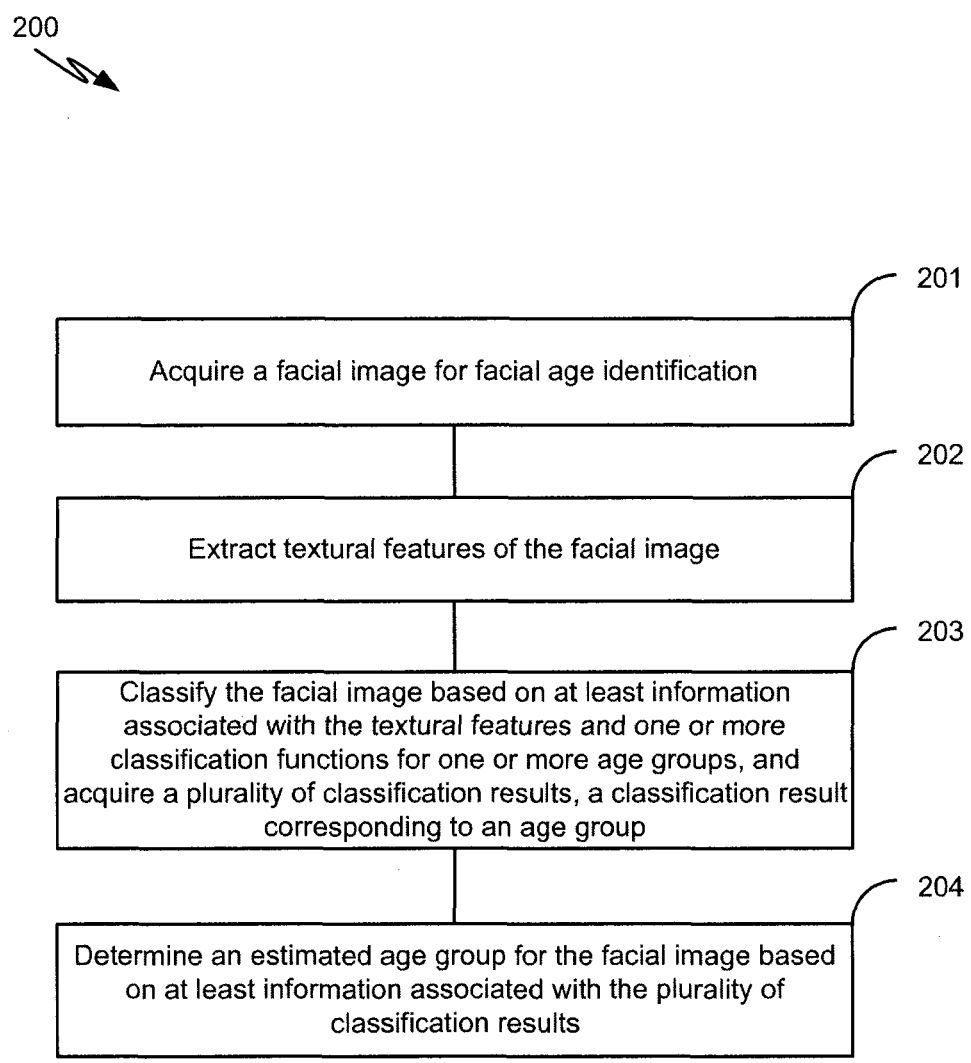
FIG. 2 is a simplified diagram showing a method for facial age identification according to one embodiment of the present invention.

FIG. 2 is a simplified diagram showing a method for facial age identification according to one embodiment of the present invention. This diagram is merely an example, which should not unduly limit the scope of the claims. One of ordinary skill in the art would recognize many variations, alternatives, and modifications. The method 200 includes at least the process 201 for acquiring a facial image for facial age identification, the process 202 for extracting textural features of the facial image, the process 203 for classifying the facial image based on at least information associated with the textural features and one or more classification functions for one or more age groups and acquiring a plurality of classification results, a classification result corresponding to an age group, and the process 204 for determining an estimated age group for the facial image based on at least information associated with the plurality of classification results.

According to one embodiment, during the process 201, a facial image is acquired for facial age identification. For example, an original image is acquired, then an adaboost algorithm and a haar characteristic algorithm are used to acquire the position of a facial frame in the original image and then the position of eyes in the facial frame. In another example, a 64×64 effective area centered on the eyes is extracted as the facial image. As an example, the facial age of the image is identified by default upon acquisition of the image, or, the facial age of the image is identified upon receipt of an instruction to identify the age.

According to another embodiment, during the process 202, textural features of the facial image are extracted. For example, during the process 203, the facial image are classified based on at least information associated with the textural features and one or more classification functions for one or more age groups, and a plurality of classification results are acquired, a classification result corresponding to an age group. In another example, the classification function is used for determining if the age of the facial image to be classified is older than the age group corresponding to the classification function. If the classification result is 1, it is determined that the facial image to be classified is older than the age group corresponding to the classification function; and if the classification result is 0, it is determined that the facial image to be classified is younger than the age group corresponding to the classification function. The classification function is realized in the form of a classifier in some embodiments.

According to yet another embodiment, for a facial image sample to be estimated, outputs of m classifiers are calculated, e.g., based on the following equation.

$$f_t = \begin{cases} 1 & age_x > age_t \\ 0 & age_x \leq age_t \end{cases} \quad (3)$$

Where $f_t$ represents one or more outputs of the classifiers, and $age_x$ represents an age to be estimated. For example, the textural features of the facial image are input into the classification function for each age group and the classification results are obtained. As an example, when the classification result of the textural features of the facial image is 1 for the age group 21-25 and 0 for the age group 36-40, it shows that the facial age is older than 25 and younger than 36. Then, the facial age is determined to be between 25 and 36.

In one embodiment, during the process 204, an estimated age group is determined for the facial image based on at least information associated with the plurality of classification results. For example, the estimated age corresponds to an age or an age group. Upon acquiring the classification results of the facial image for each age group, the estimated age group of the facial image can be roughly determined according to the plurality of classification results, in some embodiments. For instance, when the classification result of the facial image is 1 for the age group 21-25, 1 for the age group 26-30 and 0 for the age group 31-35, it shows that the facial age is between 26 and 30. In another example, the estimated age of the facial image is determined by summing up a plurality of classification results. A sum of all classification results corresponds to the estimated age of the facial image, in some embodiments. For example, the final estimated age corresponds to the sum of outputs of all classifiers according to the following equation:

$$age = \sum_t f_t \quad (4)$$

where age represents the estimated age. For example, the process 204 includes a process for calculating the estimated age group for the facial image based on at least information associated with the plurality of classification results and a span of the age group. In another example, a classification function for a first age group is determined based on at least information associated with training of positive samples and negative samples of the first age groups, the positive samples including one or more second facial image collections associated with a second age group older than the first age group, the negative samples including one or more third facial image collections associated with a third age group older than the first age group.

Figure 3:
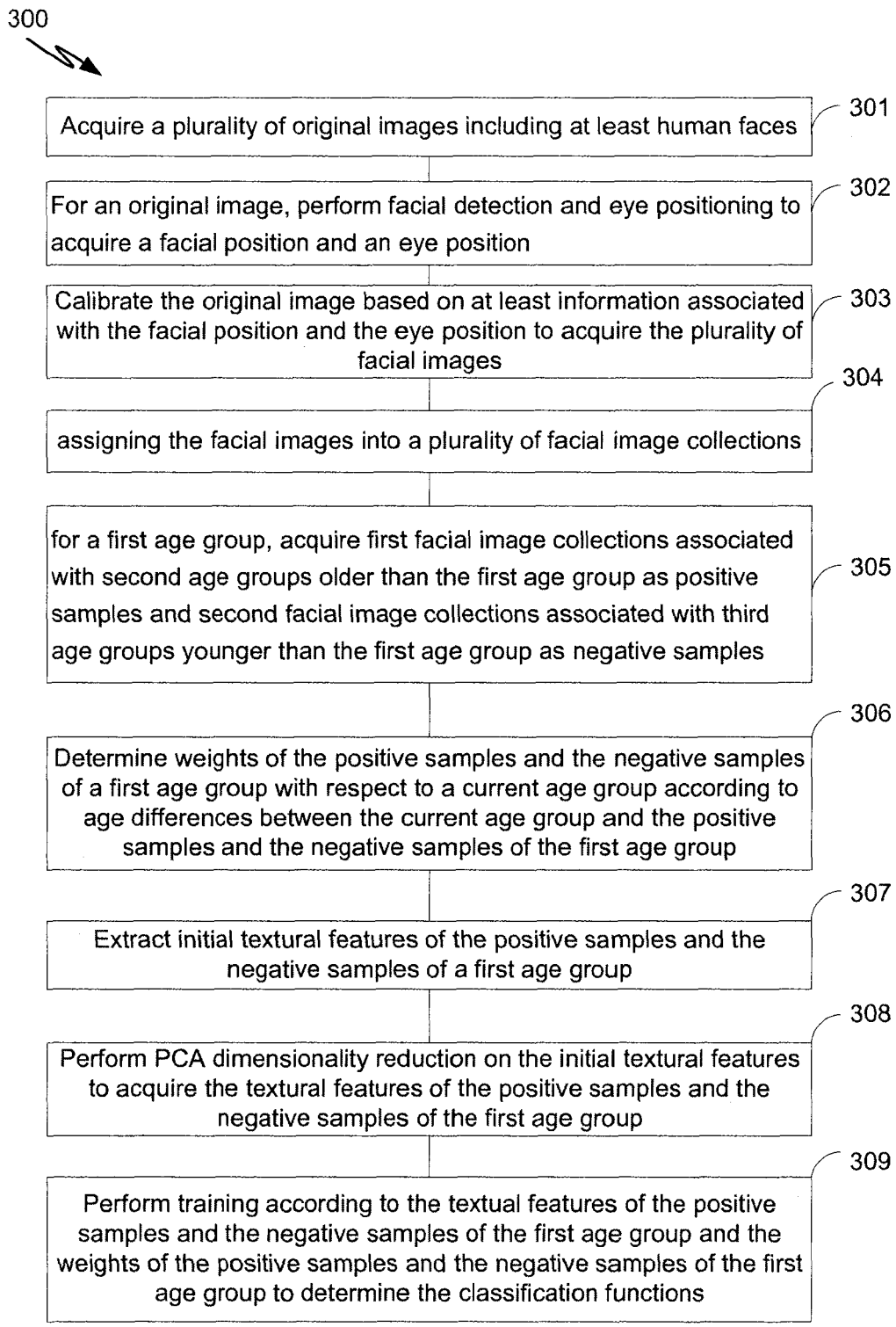
FIG. 3 is a simplified diagram showing a method for acquiring classification functions for facial age identification according to another embodiment of the present invention.

FIG. 3 is a simplified diagram showing a method for acquiring classification functions for facial age identification according to another embodiment of the present invention. This diagram is merely an example, which should not unduly limit the scope of the claims. One of ordinary skill in the art would recognize many variations, alternatives, and modifications. The method 300 includes at least the processes 301-309.

According to one embodiment, during the process 301, a plurality of original images including at least human faces are acquired. For example, during the process 302, for an original image, facial detection and eye positioning are performed to acquire a facial position and an eye position. In another example, during the process 303, the original image is calibrated based on at least information associated with the facial position and the eye position to acquire the plurality of facial images. As an example, an adaboost algorithm and a haar characteristic algorithm are used to acquire the position of a facial frame in the image and obtain the position of eyes in the facial frame. A 64×64 effective area centered on the eyes is extracted. In order to improve the accuracy during the sample training after the effective area is acquired, the image in the effective area is calibrated, in some embodiments. The calibration process is performed according to a predetermined standard template, for example.

According to another embodiment, during the process 304, the facial images are assigned into a plurality of facial image collections, where a facial image collection corresponds to an age group and a facial image collection includes at least one facial image. For example, each age is taken as an age group. In another example, the facial images of a first facial age are assigned to a first facial image collection, and the facial images of a second facial age are assigned to a second facial image collection. Then, the first facial image collection corresponds to the first facial age and the second facial image collection corresponds to the second facial age. Multiple facial images are assigned to a plurality of facial image collections according to one or more predetermined age groups, where each age group corresponds to a facial image collection, in some embodiments.

According to yet another embodiment, during the process 305, for a first age group, first facial image collections associated with second age groups older than the first age group are acquired as positive samples and second facial image collections associated with third age groups younger than the first age group are acquired as negative samples. For example, during the process 306, weights of the positive samples and the negative samples of a first age group are determined with respect to a current age group according to age differences between the current age group and the positive samples and the negative samples of the first age group. As an example, a weight of a facial image collection with respect to the current age group indicates the effects of the age group to which the facial image collection belongs on determination of the classification function. In some embodiments, the classification function is determined based on the age difference between an age group of the facial image collection and the current age group. For example, the samples are determined based on the weights according to the following equations:

$$sample_{pos} = \{w_s \times sample | age_s > age_t + k\}$$

$$w_s = dis(age_s, age_t) \quad (5)$$

$$sample_{neg} = \{w_s \times sample | age_s > age_t - k\}$$

$$w_s = dis(age_s, age_t) \quad (6)$$

where $sample_{pos}$ represents the positive samples, $age_s$ represents an age of a facial image of which sample attributes are to be determined, $age_t$ represents an age group of which a classification function is to be determined, k represents an adjustment threshold, and $w_s$ represents an age difference between the age of a facial image of which sample attributes are to be determined and the age group of which a classification function is to be determined. As an example, a facial image collection corresponding to an age group 31-35 is taken as the image collection A. A facial image collection corresponding to an age group 71-75 is taken as the image collection B. Both the age group 31-35 and the age group 71-75 are older than an age group 26-30. The image collection A and the image collection B play different roles in the training for the age group 26-30. The weights of the age group 31-35 and the age group 71-75 with respect to the age group 26-30 are determined according to the age difference between the age group 31-35 and the age group 26-30 and between the age group 71-75 and the age group 26-30, in some embodiments. For example, the weight of the age group 31-35 with respect to the age group 26-30 is 1, and the weight of the age group 71-75 with respect to the age group 26-30 is 8. In another example, with respect to a particular age group, different age groups of a same class have different weights. Sample training is carried out based on the textural features and the weights of positive samples and the negative samples, in certain embodiments.

In one embodiment, during the process 307, initial textural features of the positive samples and the negative samples of a first age group are extracted. For example, BIM (biologically inspired model) features of a sample image are extracted as follows:

a) establishing 64 sets of gabor filters and filtering the sample image based on 16 scales and 4 orientations to obtain a gabor image using the 64 sets of gabor filters;
b) dividing all gabor images into 8 parts, where each part includes 2 scales and 4 orientations;
c) selecting one set of m×n masks and dividing the original gabor image to obtain two sets of serial gabor features along each orientation of each part; and
d) comparing the gabor features corresponding to the two scales of each part to select a highest value of the corresponding feature dimension as a final feature output.

The sizes of the masks are adjusted, and the operations c)-d) are repeated k times to obtain k sets of features. For each part, k×4 sets of features are obtained, and eventually k×4×8 sets of BIM features are obtained for the sample image which represents the initial textual features, in some embodiments. As an example, m, n and k are positive integers. For example, in the calculation of BIM features, the filter parameters and the mask sizes can be adjusted.

In another embodiment, during the process 309, principal-component-analysis (PCA) dimensionality reduction is performed on the initial textural features to acquire the textural features of the positive samples and the negative samples of the first age group. For example, if the feature dimension is too large during the extraction of textural features, all 8 parts are integrated as one part so that the features in each orientation represent a highest value of the features under different masks of all parts to obtain k×4 sets of features. In another example, after the k×4×8 sets of BIM features are obtained, the PCA dimensionality reduction is performed on the k×4×8 sets of BIM features to obtain the textural features of the sample image.

In yet another embodiment, during the process 309, training is performed according to the textual features of the positive samples and the negative samples of the first age group and the weights of the positive samples and the negative samples of the first age group to determine the classification functions.

In some embodiments, the method 300 is executed by a classification server or a terminal for calculation which acquires a plurality of facial images as samples, selects positive samples and negative samples for each age group for training and determines a classification function for each age group. For example, the determined classification function is used to identify a facial age on the terminal. In another example, the terminal only identifies a facial age according to the determined classification function while the classification server is responsible for determining the classification function. In yet another example, the terminal is responsible for both determining the classification function and identifying a facial age according to the determined classification function. The terminal provides samples for classification function training according to the facial-age-identification results so that the accuracy of the classification function can be further improved by optimizing the classification function based on the facial-age-identification results and the facial images on the terminal, in some embodiments.

In certain embodiments, after the process 309, the method 300 includes a process for determining an estimated age of a facial image according to the classification function for each age group. For example, a facial image is acquired, and textural features of the facial image are extracted. A plurality of classification results are acquired according to the textural features and a classification function for each age group. An estimated age is determined for the facial image according to the plurality of classification results. The process for determining the estimated age of the facial image according to the plurality of classification results includes: calculating an estimated age for the facial image according to the plurality of classification results and a span of the age group, in some embodiments. For example, the plurality of classification results are summed up and the summed-up value is multiplied with the age span to obtain the estimated age of the facial image.

In one embodiment, if the age span is 1, i.e. each year constitutes an age group, a classification result of 1 shows that the facial age is older than the current age group, and a classification result of 0 shows that the facial age is younger than the current age group. If there are 34 results of 1 among the final classification results of a facial image, the facial age of the facial image is determined to be 34. That is, the final estimated age is the sum of all classification results, in certain embodiments.

In another embodiment, if the age span is 5, i.e. every five years constitute an age group, a classification result of 1 shows the facial age is older than the current age group, and a classification result of 0 shows the facial age is younger than the current age group. If there are 6 results of 1 among the final classification results of a facial image, the facial age of the facial image is determined to be older than or the same as the age group of 26-30 but younger than the age group of 31-35. For example, the facial age is determined to be between 26 and 30, i.e. the final estimated age falls in the age group equal to the product of the sum of all classification results and the age span.

In some embodiments, the process 309 is executed as follows. For example, the terminal acquires the facial images and sends them to the classification server. As an example, the classification server classifies the facial images according to the classification function for each age group, determines the estimated age of the facial image according to the classification results and sends them to the terminal. In certain embodiments, the process 309 is executed as follows. For example, the terminal receives and stores the classification function for each age group determined by the server. As an example, upon acquisition of facial images, the terminal extracts the textural features, acquires the classification results of each age group according to such textural features and the classification function for each age group, and determines the estimated age of the facial image.

Figure 4:
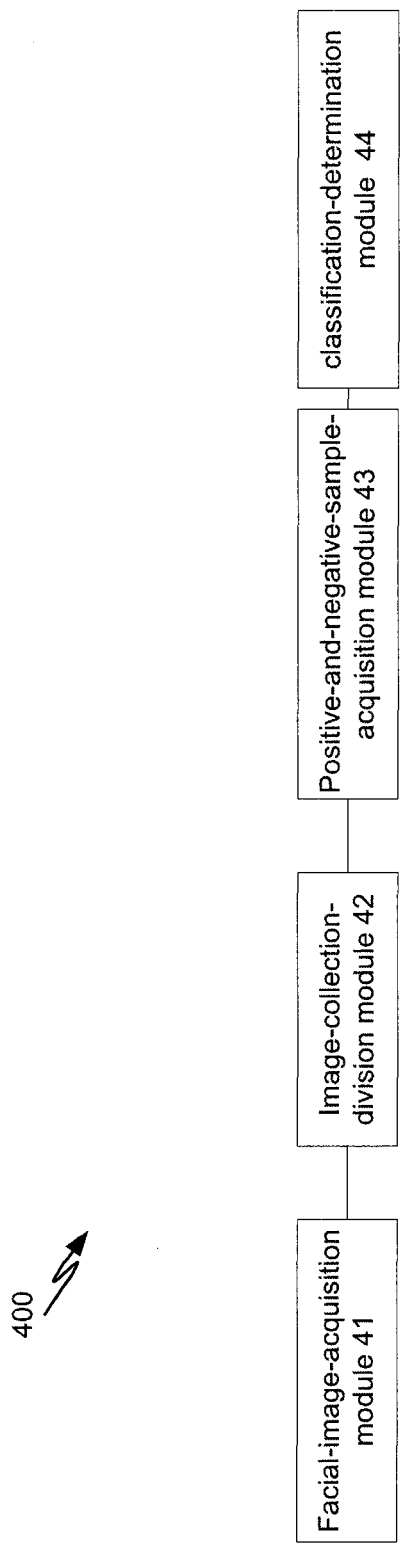
FIG. 4 is a simplified diagram showing a device for acquiring classification functions for facial age identification according to one embodiment of the present invention.

FIG. 4 is a simplified diagram showing a device for acquiring classification functions for facial age identification according to one embodiment of the present invention. This diagram is merely an example, which should not unduly limit the scope of the claims. One of ordinary skill in the art would recognize many variations, alternatives, and modifications. The device 400 includes: a facial-image-acquisition module 41, an image-collection-division module 42, a positive-and-negative-sample-acquisition module 43 and a classification-function-determination module 44.

According to one embodiment, the facial-image-acquisition module 41 is configured to acquire a plurality of facial images. For example, the image-collection-division module 42 is connected to the facial-image-acquisition module 41 and configured to assign the facial images into a plurality of facial image collections based on at least information associated with a plurality of first age groups to be identified, wherein a first age group corresponds to a facial image collection and a facial image collection includes one or more facial images. In another example, the positive-and-negative-sample-acquisition module 43 is connected to the image-collection-division module 42 and configured to, for a first age group, acquire one or more first facial image collections associated with one or more second age groups older than the first age group as positive samples and acquire one or more second facial image collections associated with one or more third age groups younger than the first age group as negative samples. In yet another example, the classification-function-determination module 44 is collected to the positive-and-negative-sample-acquisition module 43 and configured to perform training based on at least information associated with the first positive samples and the negative samples to determine one or more classification functions for the first age groups.

According to another embodiment, the device 400 includes a weight-determination module configured to determine weights of the positive samples and the negative samples of a first age group with respect to a current age group based on at least information associated with age differences between the current age group and the positive samples and the negative samples of the first age group. For example, the classification-function-determination module 44 includes a classification-determination unit configured to perform training based on at least information associated with the positive samples and the negative samples of a first age group and the weights of the positive samples and the negative samples of the first age group to determine the one or more classification functions. In another example, the facial-image-acquisition module 41 includes: an original-image-acquisition unit configured to acquire a plurality of original images including at least human faces and a facial-image-acquisition unit configured to acquire the plurality of facial images based on at least information associated with the original images. In yet another example, the facial-image-acquisition unit includes: a positioning subunit configured to, for an original image, perform facial detection and eye positioning to acquire a facial position and an eye position, and a calibration subunit configured to calibrate the original image based on at least information associated with the facial position and the eye position to acquire the plurality of facial images.

According to yet another embodiment, the classification-function-determination module 44 includes: a feature-extraction unit configured to extract textural features of the positive samples and the negative samples of a first age group, and a classification-training unit configured to perform training based on at least information associated with the textual features of the positive samples and the negative samples of the first age group and the weights of the positive samples and the negative samples of the first age group to determine the classification functions. For example, the feature-extraction unit includes: an initial-feature-extraction subunit configured to extract initial textural features of positive samples and the negative samples of a first age group, and a dimensionality-reduction unit configured to perform Principal component analysis (PCA) dimensionality reduction on the initial textural features to acquire the textural features of the positive samples and the negative samples of the first age group. In one embodiment, the device 400 further includes: an age estimate module configured to determine an estimated age of a facial image based on at least information associated with the classification functions.

Figure 5:
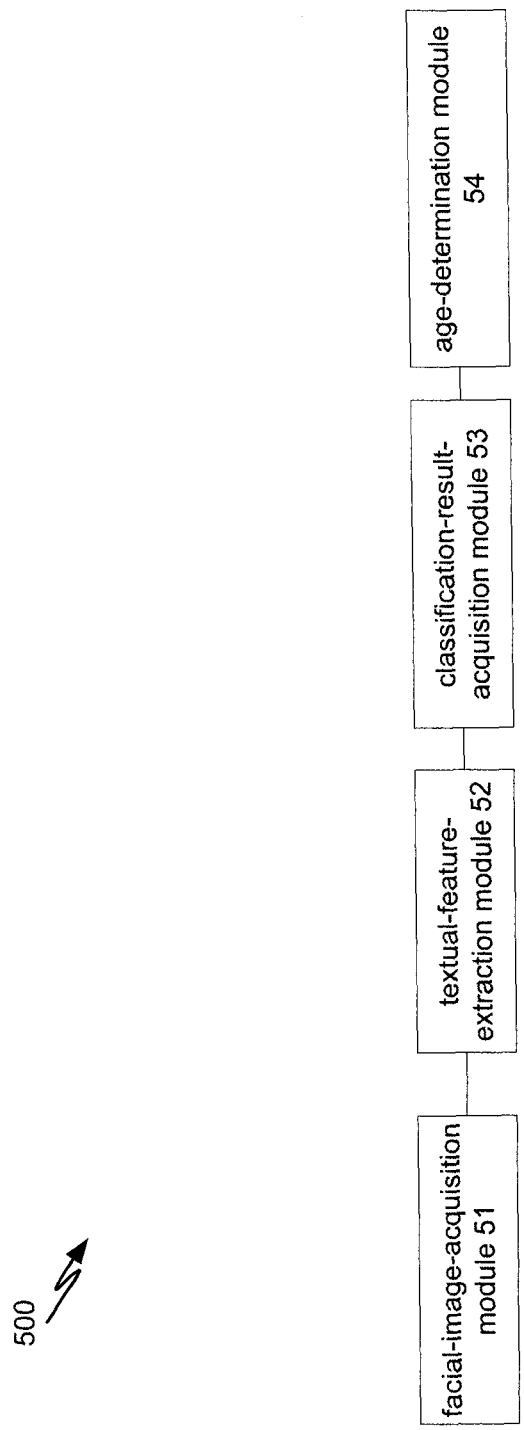
FIG. 5 is a simplified diagram showing a device for facial age identification according to one embodiment of the present invention.

FIG. 5 is a simplified diagram showing a device for facial age identification according to one embodiment of the present invention. This diagram is merely an example, which should not unduly limit the scope of the claims. One of ordinary skill in the art would recognize many variations, alternatives, and modifications. The device 500 includes: a facial-image-acquisition module 51, a textual-feature-extraction module 52, a classification-result-acquisition module 53 and an age-determination module 54.

According to one embodiment, the facial-image-acquisition module 51 is configured to acquire a facial image for facial age identification. For example, the textual-feature-extraction module 52 is connected to the to-be-identified image acquire module 51 and configured to extract textural features of the facial image. In another example, the classification-result-acquisition module 53 is connected to the textual-feature-extraction module 52 and configured to classify the facial image based on at least information associated with the textural features and one or more classification functions for one or more age groups and acquire a plurality of classification results, a classification result corresponding to an age group. In yet another example, the age-determination module 54 is connected to the classification-result-acquisition module 53 and configured to determine an estimated age group for the facial image based on at least information associated with the plurality of classification results.

According to another embodiment, the age-determination module 54 includes an age-determination-module unit configured to calculate the estimated age group for the facial image based on at least information associated with the plurality of classification results and a span of the age group. For example, a classification function for a first age group is determined based on at least information associated with training of positive samples and negative samples of the first age groups, the positive samples including one or more second facial image collections associated with a second age group older than the first age group, the negative samples including one or more third facial image collections associated with a third age group older than the first age group.

In certain embodiments, an experiment establishes a data set that contains about 165,000 images. For example, the numbers of images of different age groups in the data set are shown in Table 1.

TABLE 1

| Age | Number of images |
| --- | --- |
| 0 | 176 |
| 1 | 154 |
| 2 | 170 |
| 3 | 51 |
| 4 | 329 |
| 5 | 296 |
| 6 | 287 |
| 7 | 90 |
| 8 | 158 |
| 9 | 153 |
| 10 | 199 |
| 11 | 132 |
| 12 | 130 |
| 13 | 109 |
| 14 | 236 |
| 15 | 230 |
| 16 | 1688 |
| 17 | 2024 |
| 18 | 2247 |
| 19 | 2153 |
| 20 | 2021 |
| 21 | 7038 |
| 22 | 7178 |
| 23 | 7178 |
| 24 | 7153 |
| 25 | 7153 |
| 26 | 6469 |
| 27 | 6361 |
| 28 | 6403 |
| 29 | 6134 |
| 30 | 6150 |
| 31 | 6207 |
| 32 | 6072 |
| 33 | 6491 |
| 34 | 6542 |
| 35 | 6822 |
| 36 | 3897 |
| 37 | 3813 |
| 38 | 3643 |
| 39 | 3575 |
| 40 | 3574 |
| 41 | 2886 |
| 42 | 2923 |
| 43 | 2682 |
| 44 | 2625 |
| 45 | 2495 |
| 46 | 1636 |
| 47 | 1563 |
| 48 | 1401 |
| 49 | 1311 |
| 50 | 1261 |
| 51 | 867 |
| 52 | 815 |
| 53 | 730 |
| 54 | 631 |
| 55 | 542 |
| 56 | 511 |
| 57 | 434 |
| 58 | 403 |
| 59 | 353 |
| 60 | 329 |
| 61 | 117 |
| 62 | 96 |
| 63 | 78 |
| 64 | 74 |
| 65 | 52 |
| 66 | 63 |
| 67 | 60 |
| 68 | 49 |
| 69 | 54 |
| 70 | 144 |
| 71 | 80 |
| 72 | 75 |
| 73 | 75 |
| 74 | 79 |
| 75 | 1 |
| 76 | 2 |
| 77 | 2 |

In one embodiment, the age identification results are compared for two classifier modes, as shown in Table 2.

TABLE 2

| Methods | Age error |
| --- | --- |
| Traditional multi-classification | 5.23 |
| Methods described in this disclosure | 4.71 |

Table 2 shows that certain method described in this disclosure realizes a substantial improvement compared with a traditional multi-classification, according to some embodiments of the present invention. The final accuracy of age identification can satisfy the requirements of a real-time face identification system in some embodiments. For example, all threshold values are adjustable according to actual training samples.

Figure 6:
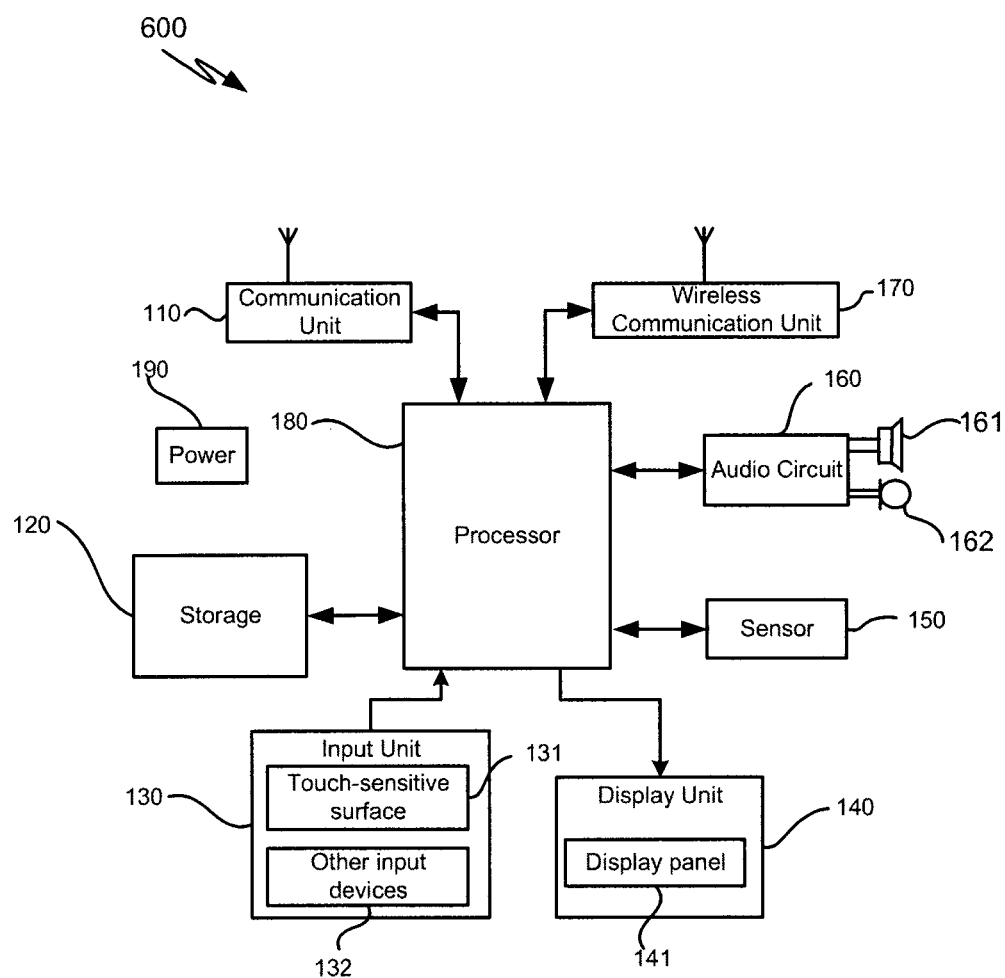
FIG. 6 is a simplified diagram showing a terminal for acquiring classification functions for facial age identification or a terminal for facial age identification according to some embodiments of the present invention.

FIG. 6 is a simplified diagram showing a terminal for acquiring classification functions for facial age identification or a terminal for facial age identification according to some embodiments of the present invention. This diagram is merely an example, which should not unduly limit the scope of the claims. One of ordinary skill in the art would recognize many variations, alternatives, and modifications. The terminal 600 is used to execute the methods as shown in FIG. 1, FIG. 2 and/or FIG. 3.

According to one embodiment, the terminal 600 includes a communication unit 110, a memory 120 that includes one or more computer-readable storage medium, an input unit 130, a display unit 140, a sensor 150, an audio circuit 160, a wireless (e.g., wireless fidelity) communication unit 170, a processor 180 that includes one or more processing cores, and a power source 190. For example, the communication unit 110 is configured to receive and transmit information or signals during a conversation. As an example, the communication unit 110 includes a radio-frequency (RF) circuit, a router, a MODEM or other network communication equipments. In another example, when including an RF circuit, the communication unit 110 receives downlink data from a base station and delivers the data to one or more processors 180. In yet another example, the communication unit 110 sends uplink data to the base station. For example, the communication unit 110 includes an antenna, one or more amplifiers, a tuner, one or more oscillators, a subscriber ID module (SIM) card, a transceiver, a coupler, an low-noise amplifier (LNA) and/or a duplexer. In another example, the communication unit 110 communicates with the network and other equipments via wireless communication based on any communication standard or protocols, such as GSM (Global System of Mobile communication), GPRS (General Packet Radio Service), CDMA (Code Division Multiple Access), WCDMA (Wideband Code Division Multiple Access), LTE (Long Term Evolution), email and SMS (Short Messaging Service).

According to another embodiment, the memory 120 is configured to store software programs and modules. For example, the processor 180 is configured to execute various functional applications and data processing by running the software programs and modules stored in the memory 120. The memory 120 includes a program storage area and a data storage area, where the program storage area may store the operating system, and the application(s) required by one or more functions (e.g., an audio player or a video player), in some embodiments. For example, the data storage area stores the data created based on the use of the terminal 600 (e.g., audio data or a phone book). In another example, the memory 120 includes a high-speed random access storage, a non-volatile memory, one or more floppy disc storage devices, a flash storage device or other volatile solid storage devices. As an example, the memory 120 further includes a memory controller to enable access to the memory 120 by the processor 180 and the input unit 130.

According to yet another embodiment, the input unit 130 is configured to receive an input number or character data and generate inputs for a keyboard, a mouse, and a joystick, optical or track signals relating to user setting and functional control. For example, the input unit 130 includes a touch-sensitive surface 131 and other input devices 132. The touch-sensitive surface 131 (e.g., a touch screen or a touch panel) is configured to receive the user's touch operations thereon or nearby (e.g., the user's operations on or near the touch-sensitive surface 131 with a finger, a touch pen or any other appropriate object or attachment) and drive the corresponding connected devices according to the predetermined program. For example, the touch-sensitive surface 131 includes two parts, namely a touch detector and a touch controller. The touch detector detects the position of user touch and the signals arising from such touches and sends the signals to the touch controller. The touch controller receives touch data from the touch detector, converts the touch data into the coordinates of the touch point, sends the coordinates to the processor 180 and receives and executes the commands received from the processor 180. For example, the touch-sensitive surface 131 is of a resistance type, a capacitance type, an infrared type and a surface acoustic wave type. In another example, other than the touch-sensitive surface 131, the input unit 130 includes the other input devices 132. For example, the other input devices 132 include one or more physical keyboards, one or more functional keys (e.g., volume control keys or switch keys), a track ball, a mouse and/or a joystick.

According to yet another embodiment, the display unit 140 is configured to display data input from a user or provided to the user, and includes various graphical user interfaces of the terminal 600. For example, these graphical user interfaces include graphs, texts, icons, videos and a combination thereof. The display unit 140 includes a display panel 141 which contains a LCD (liquid crystal display), an OLED (organic light-emitting diode). As an example, the touch-sensitive surface 131 can cover the display panel 141. For example, upon detecting any touch operations thereon or nearby, the touch-sensitive surface 131 sends signals to the processor 180 to determine the type of the touch events and then the processor 180 provides corresponding visual outputs on the display panel 141 according to the type of the touch events. Although the touch-sensitive surface 131 and the display panel 141 are two independent parts for input and output respectively, the touch-sensitive surface 131 and the display panel 141 can be integrated for input and output, in some embodiments.

In one embodiment, the terminal 600 includes a sensor 150 (e.g., an optical sensor, a motion sensor or other sensors). For example, the sensor 150 includes an environment optical sensor and adjusts the brightness of the display panel 141 according to the environmental luminance. In another example, the sensor 150 includes a proximity sensor and turns off or backlights the display panel 141 when the terminal 600 moves close to an ear of a user. In yet another example, the sensor 150 includes a motion sensor (e.g., a gravity acceleration sensor) and detects a magnitude of acceleration in all directions (e.g., three axes). Particularly, the sensor 150 detects a magnitude and a direction of gravity when staying still. In some embodiments, the sensor 150 is used for identifying movements of a cell phone (e.g., a switch of screen direction between horizontal and vertical, related games, and a calibration related to a magnetometer) and features related to vibration identification (e.g., a pedometer or a strike). In certain embodiments, the sensor 150 includes a gyroscope, a barometer, a hygroscope, a thermometer and/or an infrared sensor.

In another embodiment, the audio circuit 160, the speaker 161, and the microphone 162 are configured to provide an audio interface between a user and the terminal 600. For example, the audio circuit 160 is configured to transmit electrical signals converted from certain audio data to the speaker 161 that converts such electrical signals into some output audio signals. In another example, the microphone 162 is configured to convert audio signals into electrical signals which are converted into audio data by the audio circuit 160. The audio data are processed in the processor 180 and received by the communication unit 110 (e.g., a RF circuit) before being sent to another terminal, in some embodiments. For example, the audio data are output to the memory 120 for further processing. As an example, the audio circuit 160 includes an earphone jack for communication between a peripheral earphone and the terminal 600.

For wireless communication, the terminal 600 includes a wireless communication unit 170 which contains a WiFi module, in some embodiments. WiFi is a short-distance wireless transmission technology. Through the wireless communication unit 170, the terminal 600 enables the user to receive and send emails, browse webpages, and/or access stream media. For example, the terminal 600 is configured to provide the user with a wireless broadband Internet access. In some embodiments, the wireless communication unit 170 is omitted in the terminal 600.

According to one embodiment, the processor 180 is the control center of the terminal 600. For example, the processor 180 is connected to various parts of the terminal 600 (e.g., a cell phone) via various interfaces and circuits, and executes various features of the terminal 600 and processes various data through operating or executing the software programs and/or modules stored in the memory 120 and calling the data stored in the memory 120, so as to monitor and control the terminal 600 (e.g., a cell phone). As an example, the processor 180 includes one or more processing cores. In another example, the processor 180 is integrated with an application processor and a modem processor, where the application processor mainly handles the operating system, the user interface and the applications and the modem processor mainly handles wireless communications. In some embodiments, the modem processor is not integrated into the processor 180.

According to another embodiment, the terminal 600 includes the power source 190 (e.g., a battery) that powers up various parts. For example, the power source 190 is logically connected to the processor 180 via a power source management system so that the charging, discharging and power consumption can be managed via the power source management system. In another example, the power source 190 includes one or more DC or AC power sources, a recharging system, a power-failure-detection circuit, a power converter, an inverter, a power source state indicator, or other components. In yet another example, the terminal 600 includes a camcorder, a Bluetooth module, etc.

According to one embodiment, a method is provided for acquiring classification functions for facial age identification. For example, a plurality of facial images associated with different ages are acquired; the facial images are assigned into a plurality of facial image collections based on at least information associated with a plurality of first age groups, wherein a first age group corresponds to a facial image collection and a facial image collection includes one or more facial images; for a first age group, one or more first facial image collections associated with one or more second age groups older than the first age group are acquired as positive samples; one or more second facial image collections associated with one or more third age groups younger than the first age group are acquired as negative samples; and training is performed based on at least information associated with the first positive samples and the negative samples to determine one or more classification functions for the first age groups. For example, the method is implemented according to at least FIG. 1, and/or FIG. 3.

According to another embodiment, a method is provided for facial age identification. For example, a facial image is acquired for facial age identification; textural features of the facial image are extracted; the facial image are classified based on at least information associated with the textural features and one or more classification functions for one or more age groups; a plurality of classification results are acquired, a classification result corresponding to an age group; and an estimated age group for the facial image is determined based on at least information associated with the plurality of classification results. For example, the method is implemented according to at least FIG. 2.

According to yet another embodiment, a device for acquiring classification functions for facial age identification includes a facial-image-acquisition module configured to acquire a plurality of facial images, an image-collection-division module configured to assign the facial images into a plurality of facial image collections based on at least information associated with a plurality of first age groups to be identified, wherein a first age group corresponds to a facial image collection and a facial image collection includes one or more facial images, a positive-and-negative-sample-acquisition module configured to, for a first age group, acquire one or more first facial image collections associated with one or more second age groups older than the first age group as positive samples and acquire one or more second facial image collections associated with one or more third age groups younger than the first age group as negative samples, and a classification-function-determination module configured to perform training based on at least information associated with the first positive samples and the negative samples to determine one or more classification functions for the first age groups. For example, the device is implemented according to at least FIG. 4.

In one embodiment, a device for facial age identification includes a facial-image-acquisition module configured to acquire a facial image for facial age identification, a textural-feature-extraction module configured to extract textural features of the facial image, a classification-result-acquisition module configured to classify the facial image based on at least information associated with the textural features and one or more classification functions for one or more age groups and acquire a plurality of classification results, a classification result corresponding to an age group, and an age-determination module configured to determine an estimated age group for the facial image based on at least information associated with the plurality of classification results. For example, the device is implemented according to at least FIG. 5.

In another embodiment, a system for acquiring classification functions for facial age identification includes one or more data processors, and a computer-readable storage medium encoded with instructions for commanding the data processors to execute certain operations. For example, a plurality of facial images associated with different ages are acquired; the facial images are assigned into a plurality of facial image collections based on at least information associated with a plurality of first age groups, wherein a first age group corresponds to a facial image collection and a facial image collection includes one or more facial images; for a first age group, one or more first facial image collections associated with one or more second age groups older than the first age group are acquired as positive samples; one or more second facial image collections associated with one or more third age groups younger than the first age group are acquired as negative samples; and training is performed based on at least information associated with the first positive samples and the negative samples to determine one or more classification functions for the first age groups. For example, the system is implemented according to at least FIG. 1, and/or FIG. 3.

In yet another embodiment, a system for facial age identification includes one or more data processors and a computer-readable storage medium encoded with instructions for commanding the data processors to execute operations. For example, a facial image is acquired for facial age identification; textural features of the facial image are extracted; the facial image are classified based on at least information associated with the textural features and one or more classification functions for one or more age groups; a plurality of classification results are acquired, a classification result corresponding to an age group; and an estimated age group for the facial image is determined based on at least information associated with the plurality of classification results. For example, the system is implemented according to at least FIG. 2.

According to one embodiment, a non-transitory computer readable storage medium comprises programming instructions for acquiring classification functions for facial age identification. The programming instructions are configured to cause one or more data processors to execute operations. For example, a plurality of facial images associated with different ages are acquired; the facial images are assigned into a plurality of facial image collections based on at least information associated with a plurality of first age groups, wherein a first age group corresponds to a facial image collection and a facial image collection includes one or more facial images; for a first age group, one or more first facial image collections associated with one or more second age groups older than the first age group are acquired as positive samples; one or more second facial image collections associated with one or more third age groups younger than the first age group are acquired as negative samples; and training is performed based on at least information associated with the first positive samples and the negative samples to determine one or more classification functions for the first age groups. For example, the storage medium is implemented according to at least FIG. 1, and/or FIG. 3.

According to another embodiment, a non-transitory computer readable storage medium comprises programming instructions for facial age identification. The programming instructions are configured to cause one or more data processors to execute operations. For example, a facial image is acquired for facial age identification; textural features of the facial image are extracted; the facial image are classified based on at least information associated with the textural features and one or more classification functions for one or more age groups; a plurality of classification results are acquired, a classification result corresponding to an age group; and an estimated age group for the facial image is determined based on at least information associated with the plurality of classification results. For example, the storage medium is implemented according to at least FIG. 2.

The above only describes several scenarios presented by the present disclosure, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention is combined.

Additionally, the methods and systems described herein is implemented on many different types of processing devices by program code comprising program instructions that are executable by the device processing subsystem. The software program instructions includes source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) is stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods is provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein is connected directly or indirectly to each other in order to allow the flow of data needed for their operations. It is also noted that a module or processor includes but is not limited to a unit of code that performs a software operation, and is implemented for example as a subroutine unit of code, or as a software function unit of code, or as an object (as in an object-oriented paradigm), or as an applet, or in a computer script language, or as another type of computer code. The software components and/or functionality is located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what is claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features is described above as acting in certain combinations and even initially claimed as such, one or more features from a claimed combination can in some cases be excised from the combination, and the claimed combination is directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing is advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for acquiring classification functions for facial age identification, the method comprising:
    acquiring a plurality of facial images associated with different ages;
    assigning the facial images of the plurality of facial images into a plurality of facial image collections based on at least information associated with a plurality of first age groups, wherein each first age group of the plurality of first age groups corresponds to a facial image collection of the plurality of facial image collections, and wherein each facial image collection of the plurality of facial image collections includes one or more of the facial images;
    for each first age group of the plurality of first age groups,
        acquiring one or more first facial image collections associated with one or more second age groups older than that first age group as positive samples; and
        acquiring one or more second facial image collections associated with one or more third age groups younger than that first age group as negative samples;
    performing training based on at least information associated with the positive samples and the negative samples to determine one or more classification functions for each of the first age groups;
    determining an estimated age of an additional facial image based on at least information associated with the one or more classification functions.

2. The method of claim 1, further comprising:
    determining weights of the positive samples and the negative samples of each of the first age groups with respect to a current age group based on at least information associated with age differences between the current age group and the positive samples and the negative samples of that first age group; and
    wherein the performing training based on at least information associated with the first facial image collections and the second facial image collections to determine one or more classification functions for each of the first age groups includes:
        performing training based on at least information associated with the positive samples and the negative samples of that first age group and the weights of the positive samples and the negative samples of that first age group to determine the one or more classification functions.

3. The method of claim 1, wherein the acquiring the plurality of facial images associated with different ages includes:
    acquiring a plurality of original images including at least human faces; and
    acquiring the plurality of facial images based on at least information associated with the original images.

4. The method of claim 3, wherein the acquiring the plurality of facial images based on at least information associated with the original images includes:
    for each original image of the plurality of original images,
        performing facial detection and eye positioning in that original image to acquire a facial position and an eye position; and
        calibrating that original image based on at least information associated with the facial position and the eye position to acquire the plurality of facial images.

5. The method of claim 1, wherein the performing training based on at least information associated with the positive samples and the negative samples to determine one or more classification functions for each of the first age groups includes:
    extracting textural features of the positive samples and the negative samples of that first age group; and
    performing training based on at least information associated with the textural features of the positive samples and the negative samples of that first age group and respective weights of the positive samples and the negative samples of that first age group to determine the classification functions.

6. The method of claim 5, wherein the extracting textural features of the positive samples and the negative samples of that first age group includes:
    extracting initial textural features of the positive samples and the negative samples of that first age group; and
    performing Principal component analysis (PCA) dimensionality reduction on the initial textural features to acquire the textural features of the positive samples and the negative samples of that first age group.

7. The method of claim 1, wherein the determining the estimated age group for the facial image based on at least information associated with the plurality of classification results includes:
    calculating the estimated age group for the facial image based on at least information associated with the plurality of classification results and a span of that age group.

8. A method for facial age identification, the method comprising:
    acquiring a facial image for facial age identification;
    extracting textural features of the facial image;
    classifying the facial image based on at least information associated with the textural features and one or more classification functions for one or more age groups;
    acquiring a plurality of classification results, each classification result corresponding to an age group of the one or more age groups; and
    determining an estimated age group for the facial image based on at least information associated with the plurality of classification results;
    wherein:
        a classification function of the one or more classification functions for a first age group of the one or more age groups is determined based on at least information associated with training of positive samples and negative samples of the first age group, the positive samples including one or more second facial image collections associated with a second age group older than the first age group, the negative samples including one or more third facial image collections associated with a third age group older than the first age group;

wherein weights of the positive samples and weights of the negative samples are determined for each of the age groups with respect to a current age group based on at least information associated with age differences between the current age group and the positive samples and the negative samples of that respective age group; and wherein the classification function is determined by performing training based on at least information associated with the positive samples and the negative samples of that respective age group and the weights of the positive samples and the negative samples of that respective age group.

9. A system for acquiring classification functions for facial age identification, the system comprising:
one or more data processors; and
a computer-readable storage medium encoded with instructions for commanding the one or more data processors to execute operations including:
acquiring a plurality of facial images associated with different ages;
assigning the facial images of the plurality of facial images into a plurality of facial image collections based on at least information associated with a plurality of first age groups, wherein each first age group of the plurality of first age groups corresponds to a facial image collection of the plurality of facial image collections, and wherein each facial image collection of the plurality of facial image collections includes one or more of the facial images;
for each first age group of the plurality of first age groups,
acquiring one or more first facial image collections associated with one or more second age groups older than that first age group as positive samples; and
acquiring one or more second facial image collections associated with one or more third age groups younger than that first age group as negative samples;
performing training based on at least information associated with the positive samples and the negative samples to determine one or more classification functions for each of the first age groups; and
determining an estimated age of an additional facial image based on at least information associated with the classification functions.

10. The system of claim 9, wherein the instructions are adapted to command the one or more data processors to execute further operations including:
determining weights of the positive samples and the negative samples of that first age group with respect to a current age group based on at least information associated with age differences between the current age group and the positive samples and the negative samples of that first age group; and
wherein the performing training based on at least information associated with the first facial image collections and the second facial image collections to determine one or more classification functions for each of the first age groups includes:
performing training based on at least information associated with the positive samples and the negative samples of that first age group and the weights of the positive samples and the negative samples of that first age group to determine the one or more classification functions.

11. The system of claim 9, wherein the acquiring the plurality of facial images associated with different ages includes:
acquiring a plurality of original images including at least human faces; and
acquiring the plurality of facial images based on at least information associated with the original images.

12. The system of claim 11, wherein the acquiring the plurality of facial images based on at least information associated with the original images includes:
for each original image of the plurality of original images,
performing facial detection and eye positioning in that original image to acquire a facial position and an eye position; and
calibrating that original image based on at least information associated with the facial position and the eye position to acquire the plurality of facial images.

13. The system of claim 9, wherein the performing training based on at least information associated with the positive samples and the negative samples to determine one or more classification functions for each of the first age groups includes:
extracting textural features of the positive samples and the negative samples of that first age group; and
performing training based on at least information associated with the textural features of the positive samples and the negative samples of that first age group and respective weights of the positive samples and the negative samples of that first age group to determine the classification functions.

14. The system of claim 13, wherein the extracting textural features of the positive samples and the negative samples of that first age group includes:
extracting initial textural features of the positive samples and the negative samples of that first age group; and
performing Principal component analysis (PCA) dimensionality reduction on the initial textural features to acquire the textural features of the positive samples and the negative samples of that first age group.

15. The system of claim 9, wherein the determining the estimated age group for the facial image based on at least information associated with the plurality of classification results includes:
calculating the estimated age group for the facial image based on at least information associated with the plurality of classification results and a span of that age group.

16. A system for facial age identification, the system comprising:
one or more data processors; and
a computer-readable storage medium encoded with instructions for commanding the one or more data processors to execute operations including:
acquiring a facial image for facial age identification;
extracting textural features of the facial image;
classifying the facial image based on at least information associated with the textural features and one or more classification functions for one or more age groups;

acquiring a plurality of classification results, each classification result corresponding to an age group of the plurality of age groups; and determining an estimated age group for the facial image based on at least information associated with the plurality of classification results;

wherein:

a classification function for a first age group is determined based on at least information associated with training of positive samples and negative samples of the first age group, the positive samples including one or more second facial image collections associated with a second age group older than the first age group, the negative samples including one or more third facial image collections associated with a third age group older than the first age group;

wherein weights of the positive samples and weights of the negative samples are determined for each of the age groups with respect to a current age group based on at least information associated with age differences between the current age group and the positive samples and the negative samples of that respective age group; and wherein the classification function is determined by performing training based on at least information associated with the positive samples and the negative samples of that respective age group and the weights of the positive samples and the negative samples of that respective age group.

* * * * *